United States Patent [19]

Eaves, Jr.

[11] Patent Number: 4,774,705
[45] Date of Patent: Sep. 27, 1988

[54] SWITCH MATRIX WITH ACOUSTIC DELAY FOR TDMA SIGNAL STORAGE ON-BOARD A SATELLITE

[75] Inventor: Reuben E. Eaves, Jr., Bethesda, Md.

[73] Assignee: Communications Satellite Corporation, Washington, D.C.

[21] Appl. No.: 435,855

[22] Filed: Oct. 21, 1982

[51] Int. Cl.$^4$ .......................................... H04Q 11/04
[52] U.S. Cl. ...................................... 370/58; 370/108; 370/104
[58] Field of Search ...................... 370/58, 59, 61, 63, 370/64, 68, 108, 65, 60, 104; 379/273, 272; 340/825.79, 825.8; 178/3

[56] References Cited

U.S. PATENT DOCUMENTS

| 4,074,072 | 2/1978 | Christensen et al. | 370/65 |
| 4,145,573 | 3/1979 | Arnold | 370/104 |
| 4,456,988 | 6/1984 | Nakagome et al. | 370/108 |
| 4,472,801 | 9/1984 | Huang | 370/60 |
| 4,577,311 | 3/1986 | Duquesne et al. | 370/60 |

FOREIGN PATENT DOCUMENTS

| 0067245 | 10/1981 | European Pat. Off. | 370/59 |
| 57-24194 | 2/1982 | Japan | 370/68 |

Primary Examiner—Douglas W. Olms
Attorney, Agent, or Firm—Sughrue, Mion, Zinn, Macpeak, and Seas

[57] ABSTRACT

A switch matrix with a delay feature for temporary storage of burst communications on-board a satellite. Additional input and output ports are added to a conventional switch matrix in such a manner that, if delay is desired, the additional output ports loop their output signals through acoustical delay devices to the additional input ports whereupon they enter the matrix either for further delay or for transmission. If delay is not desired, signals pass through the matrix in a conventional manner.

17 Claims, 3 Drawing Sheets

SWITCH MATRIX WITH ACOUSTIC DELAY FOR TDMA SIGNAL STORAGE ON-BOARD A SATELLITE

BACKGROUND OF THE INVENTION

The present invention relates to a method and apparatus for providing storage of signal bursts on-board a satellite. More particularly, the invention relates to a switch matrix with a delay feature which may be used to temporarily store signal bursts on-board a satellite in a satellite-switched time division multiple access (SS-TDMA) environment.

In satellite communications, information is transmitted on an uplink channel from a fixed earth station or a mobile platform near the earth to the satellite from which it can be relayed on a downlink channel to another fixed earth station or mobile platform. In a number of important types of communication systems, it is desirable that the satellite not be required to immediately relay the uplink information on the downlink, but rather that it have the capability of storing the message for a short period until a more appropriate moment for transmission comes about.

In the part, methods for temporarily storing such signals on-board a satellite have been proposed which require elaborate signal processing to convert signals to a form appropriate for digital storage. In these systems, signals which arrive on the various uplinks are first demodulated so that the incoming signals are converted to baseband digital data. This information is then placed into digital memory where it is kept until needed. It is then read out or switched onto the appropriate downlink output, where it must be demodulated before it can be transmitted on the downlink.

This method of demodulation, storage and remodulation has several disadvantages. Increased complexity is introduced through the necessity of converting signals from their modulated form to digital data and then having to reconvert them back to modulated form. The processes of demodulation, remodulation and digital storage require the use of components which increase the mass and power requirements of the spacecraft payload. Further, extra precautions must be taken to ensure that the digital components employed are tolerant to or protected from the radiation environment of space.

SUMMARY OF THE INVENTION

The present invention eliminates the disadvantages found in the demodulation-storage-remodulation technique previously suggested. This is accomplished by retaining signals in the modulated form in which they were sent on the uplink and later retransmitting them in their original form. Temporary on-board storage is provided by using a switch matrix with a delay feature. Rather than storing a demodulated signal in a digital memory for subsequent reading out, the present invention provides extra input and output ports in its switch matrix. As in a conventional switch matrix, some of the input ports and output ports receive incoming signals and provide outgoing signals. However, a remaining portion of the output ports are connected to various delay units with the outputs of the delay units being connected to various input ports. When it becomes necessary to delay transmission of a signal, the proper delay path can be selected. The various delay paths may exhibit various degrees of delay. Upon return to the input port, the signal may be switched to an output port for retransmission or switched to another output port for further delay.

Thus, complexity and risk are reduced as modification of the input signal without storage is minimal. Further, in the event of failure of the delay devices, the system can gracefully revert to operation without storage by simply not employing the switch matrix ports corresponding to delay elements. Finally, the present invention offers potential reduction in payload mass, power, and radiation tolerance restrictions.

BRIEF DESCRIPTION OF THE DRAWINGS

The invention will be further described by way of explanation with reference to the accompanying drawings, in which.

DETAILED DESCRIPTION OF THE DRAWINGS

Figure 1:
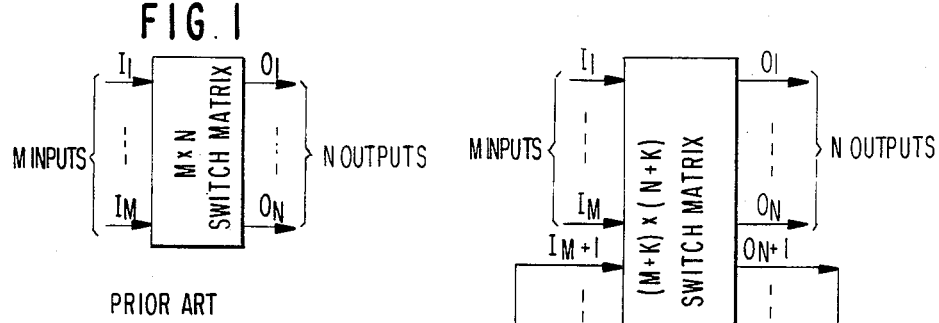
FIG. 1 is a block diagram illustrating a conventional M×N microwave switch matrix.

With reference now to FIG. 1, there is shown a conventional M×N microwave switch matrix. This type of switch matrix is typically used in SS-TDMA systems where bursts arrive via any one of M input links I1–IM and are directed to any one (or several for broadcasting) of N output links O1–ON.

Figure 2:
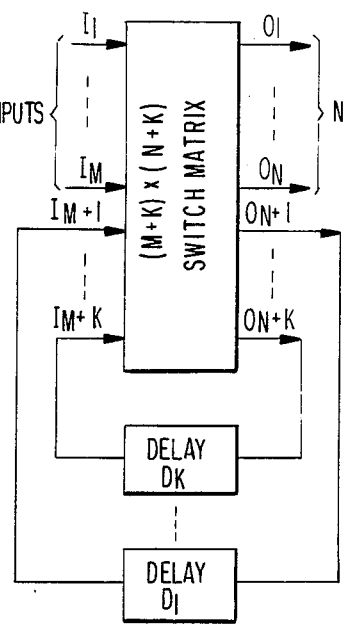
FIG. 2 is a block diagram of a switch matrix configuration with delay loops in accordance with the present invention.

Turning now to FIG. 2, there is shown a switch matrix according to the present invention with an additional K input ports and an addition K output ports and the delay units associatd therewith. Signals may enter the configuration by any one of the M open input ports I1–IM and may leave by any one of the N open output port O1–ON. The remaining K input ports IM+1–IM+K and K output ports ON+1–ON+K are connected by loopback paths which contain delay devices $D_1$–$D_K$, respectively. These delay devices may be of an acoustical type.

Figure 3:
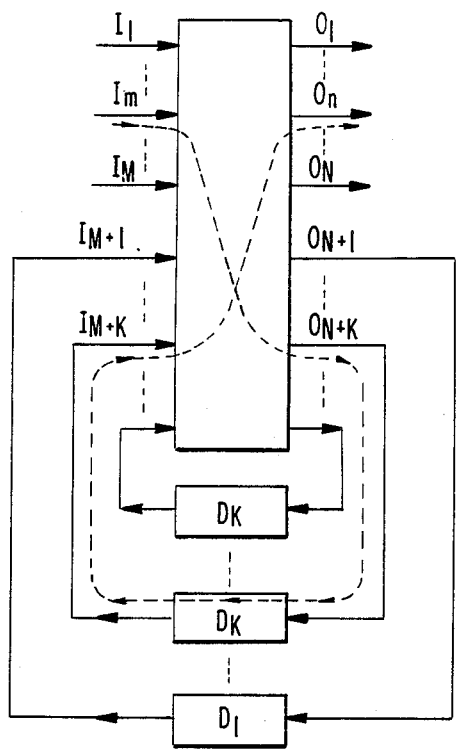
FIG. 3 is a block diagram illustrating the path of a burst signal as it passes through the switch matrix in accordance with the present invention.
Figure 5:
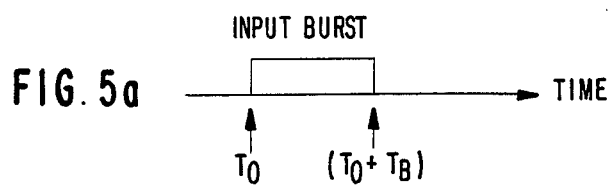
FIGS. 5a and 5b are time charts illustrating the time delay as may be attained through the device of the present invention.
Figure 5:
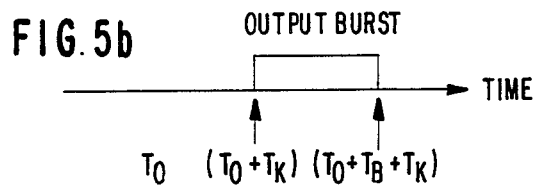

The operation of the invention will now be described by way of reference to FIG. 3 which is similar to FIG. 2 except that FIG. 3 also shows one example of the path of a signal as it passes through this embodiment of the present invention. As disclosed, this invention can be used to delay a signal after it arrives at the satellite so that it may be effectively stored thereon for transmission at a later time. To illustrate such an operation, consider the path of a signal burst of length $T_B$ which enters the input port m, $1 \leq m \leq M$, with the leading edge arriving at time $T_0$ (FIG. 5). At that time, the switch matrix is configured so that the input port Im is connected to an output port ON+k (FIG. 3), $1 \leq k \leq K$. Consequently, the signal burst is directed into delay element $D_k$ which causes a delay $T_k$ (FIG. 5). The signal emerges from the delay device at the time $T_k$ later and re-enters the switch matrix by input port $IM+k$ (FIG. 3). At that time, input port $IM+k$ can be connected to any output port on, $1 \leq n \leq N$, to cause the burst signal to exit from the configuration for transmission from the satellite. Alternatively, it still further delay is desired, input port $IM+k$ can be connected to any one of the output ports $ON+1-ON+K$. This will cause the burst to circulate through yet another delay element for additional delay.

By choosing the specific delay elements through which a signal circulates and the number of times it circulates through each, a desired total delay or storage time may be realized.

As previously disclosed, the delay devices $D_1-D_K$ may be of an acoustical type. Such acoustic delay switches may be fabricted from bulk acoustic wave (BAW) components or surface acoustic wave (SAW) components. The acoustic delay components transform electromagnetic energy to acoustic energy, so that delay can be realized through acoustic progagation, and then transform acoustic energy back to electromagnetic energy. These components may be constructed from a variety of materials (e.g., Lithium Niobate, ST-Quartz, Spinel) with a range of characteristics (e.g., delay/unit length, loss/unit length). Although the velocity of acoustic propagation varies, depending upon the material and the mode, it generally falls in the 1500 m/sec to 10,000 m/sec range, corresponding to a delay of between 0.15 and 1.0 cm/microsecond. Consequently, a delay of 500 microseconds can be realized with a propagation path of 75 cm to 500 cm. Single components can incorporate several reflections or wraparound topologies so that overall component dimensions can be of reasonable size for use on-board the spacecraft.

Acoustic delay components generally exhibit large insertion loss at microwave frequencies. It is therefore desirable to include amplification before and after the acoustic component so that each delay path will exhibit the same gain or loss as switch matrix paths that do not go through a delay. Furthermore, insertion loss in the acoustic component can be reduced by operating it at a lower frequency than that at the input and output ports. To do this, signals are down-converted to a selected frequency before the acoustic component and upconverted after the acoustic component. Typical loss characterisitcs are indicated in the following Table.

TABLE 1

| Acoustic Propagation Loss (dB/$\mu$s) For Various Media/Modes and Frequencies | | | |
|---|---|---|---|
| | 500 MHZ | 1 GHZ | 4 GNZ |
| SAW LiNbO$_3$ | .20 | .88 | 14.1 |
| SAW ST-Quartz | .66 | 2.6 | 41.9 |
| BAW MgOAl$_2$O$_3$ Transversal Mode | .02 | .06 | 1.0 |
| BAW Z-Cut Corundum Longitudinal Mode | .09 | .35 | 4.0 |

Figure 4:
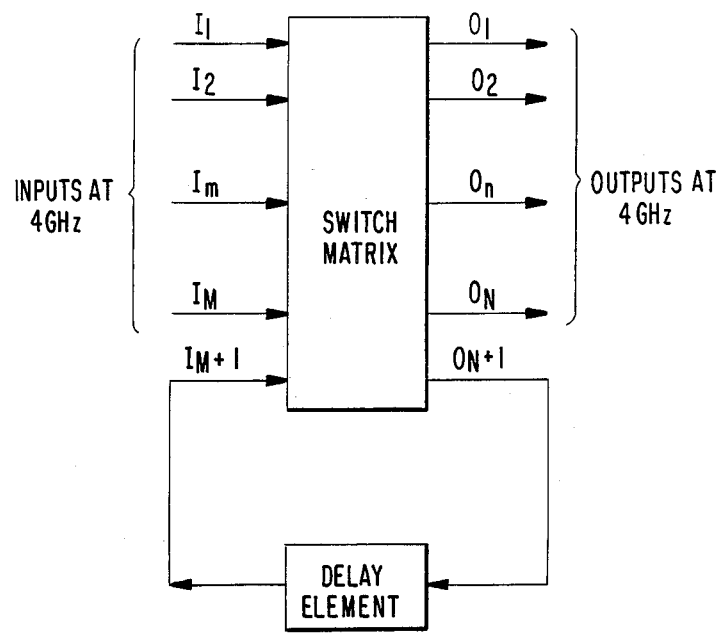
FIG. 4 is a block diagram illustrating an example of a delay element based on a frequency below that of the switch matrix.
Figure 4:
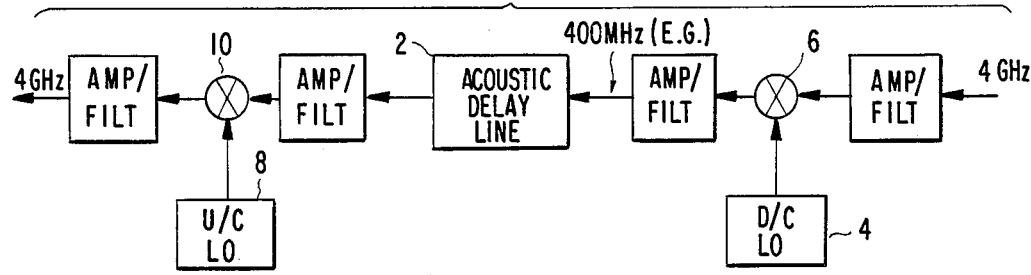

An example of a delay device which contains amplification and frequency conversion is illustrated in FIG. 4. There is illustrated in the example a delay element based on a frequency below that of the switch matrix. Amplification occurs before and after the acoustic component 2 and signals are down-converted at mixer 6 to a selected frequency before the acoustic component 2 and up-converted at mixer 10 after the acoustic component.

These internal details of acoustic delay devices are presented to establish the practically of realizing the delays which are useful for communications. The overall structure of the invention is not limited to the specific construction of the delay devices.

The description above is based upon fixed delay elements $D_1$ through $D_K$. It should be noted that acoustic delay elements can be constructed with variable delay. Whether individual delay elements are fixed or variable, the configuration can still be controlled to provide variable storage.

Figure 6:
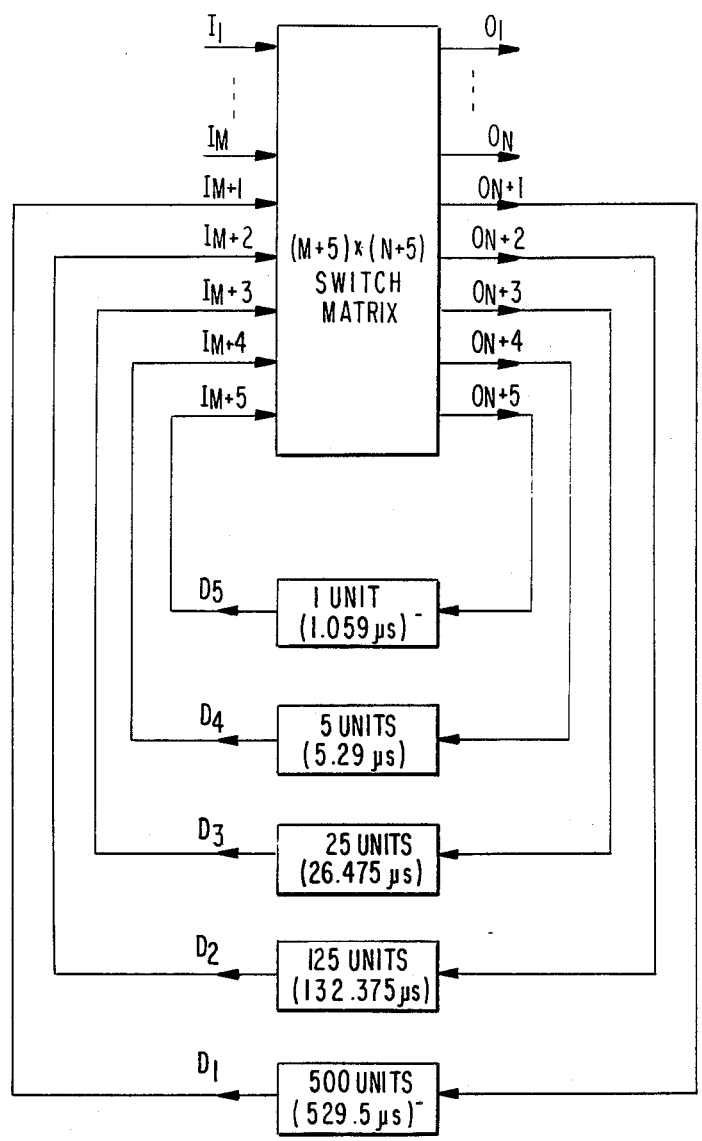
FIG. 6 is a block diagram illustraing one configuration of the present invention with five loops of different delay values.

The minimum delay that can be realized, short of passing an input signal directly to the output port, would be achieved by looping a signal through a one unit delay device. If there were only one delay loop, and this loop exhibited the minimum delay (one unit), in order to achieve a delay of 500 units one would have to circulate the input signal through the loop 500 times, with the attendant opportunities for signal distortion and noise accumulation. A more practical or implementation may be to provide for a range of delay sizes that can be sequenced to provide any desired total delay. With reference now to FIG. 6 there is shown such an implementation where the smallest possible switching unit $D_5$ exhibits a delay of 1.059 microseconds. There are increasingly greater delays exhibited in $D_4$, $D_3$, $D_2$ and $D_1$, respectively. Returning to the example above, if a delay of 500 units (529.5 microseconds) was desired, instead of looping the signal through the one unit (1.059 microsecond) delay unit $D_5$ 500 times, it could be looped through the 500 unit (529.5 microsecond) delay unit $D_1$ once. This provides a great deal of flexibility. Furthermore, it may be unnecessary in some installations to provide for such a wide range of delay units. For example, multiple loops for each delay denomination might be more appropriate given that a delay loop can only be used by one signal at a time and certain denominations of delay could be required more frequently than others.

The present invention has several notable applications in satellite communications. If a conventional switch matrix (FIG. 1) on-board a satellite is replaced or modified by the invention which has been described, a capability to delay or store signal bursts on the satellite is introduced. This provides an extra dimension of flexibility in scheduling bursts so that they do not interfere. If bursts successfully enter the switch matrix by separate input ports, but attempt to use the same output port at the same time, they would interfere with each other. However, if one of the bursts is stored until the other has exited, then both bursts can be successfully transmitted. The additional flexibility provided by on-board storage potentially can increase the efficiency of channel use and reduce requirements for ground equipment.

Storage of signal bursts can also be advantageous in satellite systems based on random access, such as ALOHA, rather than SS-TDMA. In such operations, bursts or packets are not scheduled in advanced for coordination among earth stations. Rather, each station sends a burst whenever it has accumulated enough information for transmission. In this case also, contention between two bursts which attempt to use the same downlink at the same time can be avoided by delaying one of the bursts.

The invention also has application to TDMA networks on separate satellites which are connected via an intersatellite link (ISL). In this case, bursts transmitted from one satellite to another must be given a controllable delay as the range between satellites changes, so that the bursts enter the new network in synchronism. The on-board acoustic delay configuration can be implemented at either the transmitting or receiving end of the ISL to achieve synchronism.

The invention is not necessarily limited to satellite technology. A satellite with M uplinks and N downlinks connected through a switch matrix effectively acts as a network node. Consequently, the invention that has been described can be extended to provide storage nodes in other types of networks. For example, application to a terrestrial network would permit signal packets or bursts to be buffered or stored at a network node until an appropriate time for transmission to other nodes or destinations of the network.

Although acoustic (BAW or SAW) delay line technology offers a means for implementing delays of practical size for most microwave and millimeter wave satellite communications, electromagnetic delay lines may be attractive for other applications. For example, a network based on optical links could employ burst of such short duration that links of dielectric fiber wave guide become an alternative for realizing useful delay components. Regardless of whether the delay devices are based on acoustic propagation or electromagnetic propagation, the fundamental configuration in which they appear is similar.

Although the invention has been described with reference to a particular embodiment, it will be understood to those skilled in the art that the invention is capable of a variety of alternative embodiments within the spirit and scope of the appended claims.

What is claimed is:

1. A signal storage apparatus, comprising:
   a switch matrix having a plurality of input ports and a plurality of output ports for connecting selected ones of said input ports to selected ones of said output ports, said selected output ports including first and second output ports; and
   delay means, connected between at least one of said second output ports and at least one of said input ports, for receiving a first signal from at least one of said second output ports and delaying said first signal for a predetermined time to obtain a delayed version of said first signal, and for providing only said delayed version of said first signal to said at least one input port after said predetermined time has elapsed regardless of whether or not any of said first output ports is available for connection to said at least one input port.

2. A signal storage apparatus as defined in claim 1, wherein said plurality of input ports comprise at lesat one first input port for receiving an input signal and at least one second input port for receiving a signal only from said delay means.

3. A signal storage apparatus as defined in claim 2, wherein said first output port said second output port provides a signal only to said delay means.

4. A signal storage apparatus as defined in claim 3, wherein said at least one second input port and said at least one second output port comprise a plurality of second input and output ports, respectively, and said delay means comprises a plurality of delay elements each connected between a respective second output port and respective second input port.

5. A method of storing a communications signal, comprising the steps of:
   receiving said communications signal at a first input port of a switch matrix having first and second input ports and first and second output ports;
   connecting said first input port to a first output port having a delay means connected thereto for generating a delayed version of said communications signal after a predetermined time;
   receiving only said delayed version of said communications signal at a second input port of said switch matrix after said predetermined period of time regardless of whether or not any of said second output ports is available for connection to said second input port; and
   connecting said second input port to a second output port if said second output port is available.

6. A switching network having input and output ports, comprising:
   switch means having input ports and selectable output ports for routing signal packets applied to said input ports to cause signal packets to be connected to selected ones of said output ports of said switch means; and
   delay means having input terminals and output terminals with its input terminals connected to a remaining ones of said switch means output ports and its output terminals connected to remaining ones of said switch means input ports, said delay means receiving a particular signal from said remaining ones of said switch means output ports and providing said particular signal back to one of said switch means input ports regardless of whether or not any one of said selected output ports is available to receive said particular signal.

7. A network in accordance with claim 6 wherein the number of said switch means output ports is different than the number of said switch means input ports.

8. A network in accordance with claim 6 wherein the number of said switch means output ports is different than the number of said signal packets.

9. A switching network having input and output ports, comprising:
   sorting means for sorting signal packets applied to said input ports, said sorting means having input and output ports, said sorting means causing signals to be connected to selected ones of said sorting means output ports;
   delay network means having input terminals and output terminals; and
   means for connecting said delay network means input terminals to some of the remaining ones of said sorting means output ports and said delay network output terminals to remaining ones of said sorting means input ports, said delay network means receiving a particular signal from one of said remaining ones of said sorting means output ports and providing said particular signal back to one of said remaining ones of said sorting means input ports regardless of whether or not any one of said selected switching network output ports is available to receive said particular signal.

10. A network in accordance with claim 9 wherein said delay network means comprises a plurality of delay means, each of said delay means connecting an input terminal of said delay network means to an output terminal of said delay network means.

11. A switching network in accordance with claim 9 wherein the number of said sorting means input ports is different than the number of said output ports.

12. A network in accordance with claim 9 wherein the number of said sorting means output ports is different than the number of said signal packets.

13. A signal storage apparatus, comprising:
a switch matrix having at least one first input port for receiving an input signal, a plurality of second input ports, at lest one first output port for providing an output signal and a plurality of second output ports, said switch matrix connecting selected ones of said input ports to selected ones of said output ports; and
delay means, connected between at least one of said second output ports and at least one of said input ports, for receiving a signal from said at least one second output port and providing a delayed version of said signal to said at least one input port after a predetermined time regardless of whether or not any one of said first output ports is available for connection to said at least one input port;
wherein said delay means comprises a plurality of delay elements each connected between a respective second output port and respective second input port.

14. A signal storage apparatus as defined in claim 13, wherein each of said delay elements provides a different delay time.

15. A signal storage apparatus as defined in claim 13, wherein each of said delay elements provides a variable delay time.

16. A signal storage apparatus, comprising:
a switch matrix having a plurality of input ports and a plurality of output ports for connecting selected ones of said input ports to selected ones of said output ports; and
an acoustic delay device connected between at least one of said output ports and at least one of said input ports, for receiving a signal from said at least one output port and providing a delayed version of said signal to said at least one input port.

17. A signal storage apparatus, comprising:
a switch matrix having a plurality of input ports and a plurality of output ports for connecting selected ones of said input ports to selected ones of said output ports; and
delay means connected to N of said plurality of output ports and N of said plurality of input ports, where N is an integer, for receiving at least one signal from one of said plurality of output ports and providing a delayed version of said at least one signal back to a respective one of said plurality of input ports regardless of whether or not any of said output ports other than said N output ports are available to receive said at least one signal.

* * * * *